United States Patent [19]

Bell et al.

[11] Patent Number: 5,609,403
[45] Date of Patent: Mar. 11, 1997

[54] FILM IMAGE DISPLAY APPARATUS AND METHOD

[75] Inventors: Cynthia S. Bell, Webster; Lynn K. Neff, Rochester, both of N.Y.

[73] Assignee: Eastman Kodak Company, Rochester, N.Y.

[21] Appl. No.: 336,441

[22] Filed: Nov. 9, 1994

[51] Int. Cl.$^6$ .................................................. G03B 23/00
[52] U.S. Cl. ........................................ 353/26 A; 353/25
[58] Field of Search ......................... 353/26 A, 26 R, 353/25, 15, 19; 352/15, 16, 17, 26, 27, 92, 236

[56] References Cited

U.S. PATENT DOCUMENTS

| | | | |
|---|---|---|---|
| 3,290,987 | 12/1966 | James et al. | |
| 3,981,570 | 9/1976 | Ashida et al. | 352/12 |
| 4,005,530 | 2/1977 | Takahashi et al. | 35/8 |
| 4,053,215 | 10/1977 | Haning et al. | 353/116 |
| 4,068,945 | 1/1978 | Spence-Bate | 355/54 |
| 4,122,613 | 10/1978 | Karalus et al. | 35/9 |
| 4,791,496 | 12/1988 | Kageyama et al. | 358/342 |
| 4,965,627 | 10/1990 | Robison | 355/40 |
| 4,974,096 | 11/1990 | Wash | 352/92 |
| 5,021,820 | 6/1991 | Robison et al. | 352/236 |
| 5,080,479 | 1/1992 | Rosenberg | 352/92 |
| 5,093,686 | 3/1992 | Shigaki | 355/77 |
| 5,276,472 | 1/1994 | Bell et al. | 354/76 |
| 5,424,790 | 6/1995 | Tsunefuji et al. | 353/26 A |

FOREIGN PATENT DOCUMENTS

| | | | |
|---|---|---|---|
| 2153513 | 5/1973 | France | G03B 21/00 |
| 3-73987 | 3/1991 | Japan . | |

*Primary Examiner*—William Dowling
*Attorney, Agent, or Firm*—Francis H. Boos, Jr.

[57] ABSTRACT

Film image display method and apparatus adapted to display image frames on film normally stored in a cartridge in a user selected sequence. The film carries a magnetic recording layer and the apparatus is programmed to allow the user to view image frames and hear sound recorded in association with the frames in a pre-determined viewing sequence, that may be user-determined. The viewing sequence is different from the chronological sequence of frames on the film. The apparatus and method also records data on the film which identifies the viewing sequence. Sound may be recorded in association with frames in the viewing sequence during user selection of the viewing sequence. When viewed later, the recorded sequence data is read from the film and used to control the sequence in which the film images are displayed.

15 Claims, 5 Drawing Sheets

FILM IMAGE DISPLAY APPARATUS AND METHOD

FIELD OF THE INVENTION

The invention relates to displaying of photographic film image frames and more particularly to apparatus and method for displaying such image frames in a predetermined sequence established by a user which is different from the sequence of image frames as they appear on the film.

BACKGROUND OF THE INVENTION

There has recently been proposed a camera film photofinishing system in which exposed films are returned to the camera user in a film cartridge rather than as mounted slides or negative film strips such as is generally the current practice in the industry. In the case of mounted slides, users are accustomed to sorting out unwanted slides and putting the remaining slides in a desired sequence for display with a slide projector. With film returned in a cartridge, unmounted, this sorting and sequencing would not be possible. In the case of negative film, electronic equipment for viewing negative film frames as positive images is known but there is no convenient mechanism for sorting out unwanted images and placing the remaining images in a desired viewing sequence. It is desirable therefore to provide apparatus and method whereby film returned to the customer in a cartridge can be sorted and sequenced for subsequent viewing in a convenient manner. It is further desirable to provide apparatus and method for convenient viewing in a desired sequence of images on film contained in a cartridge.

SUMMARY OF THE INVENTION

In accordance with one aspect of the invention there is provided film image display apparatus for displaying image frames on photographic film stored within a film cartridge, the film having a magnetic recording layer formed thereon, and the frames occurring in chronological sequential order on the film. The apparatus comprises a display station for receiving said cartridge and sequentially displaying images from the frames on the photographic film and magnetic read means for reading data recorded on the film magnetic layer representative of a predetermined frame viewing sequence other than the chronological sequential order. The apparatus further includes film advance control means responsive to the recorded data for periodically advancing the film to the display station for display of the image frames in the predetermined frame viewing sequence. In a particularly preferred form of the invention, the apparatus further includes user-operated means for inputting user-determined image frame number viewing sequence data and sound information; and magnetic write means for recording the user-determined sequence data and sound information on the film magnetic layer.

In a further aspect of the invention, there is provided a method of operating a film image display apparatus to display a plurality of film images, from image frames occurring in a chronological sequence on film stored in a cartridge, in a pre-determined, non-chronological frame viewing sequence, the film having a magnetic recording layer therein, wherein the method comprises the steps to inserting the film cartridge into the film image display apparatus; reading, with a magnetic read head, data recorded on the film magnetic layer representative of the pre-determined frame viewing sequence; and utilizing the read data to control the film image display apparatus to display the film images in the pre-determined viewing sequence as indicated by the recorded sequence data. The method preferably also includes periodically inputting frame viewing sequence data and sound information; and recording the inputted sequence data and sound information on the film magnetic layer.

DETAILED DESCRIPTION OF THE INVENTION

Figure 1:
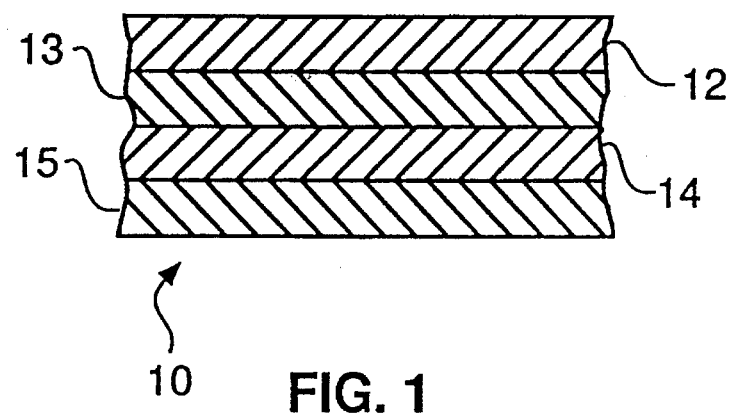
FIG. 1 is a side schematic view of a strip of photographic film bearing a magnetic layer.

Apparatus of the present invention is intended to operate in conjunction with photographic film bearing a magnetic layer on which data can be magnetically recorded. Such a film is generally described in commonly assigned U.S. Pat. No. 5,229,810, the disclosure of which is incorporated herein by reference. Briefly, as seen in FIG. 1, a strip 10 of color film, either positive or negative, includes a base 13, a plurality of well known photochemical layers 12 on one side of the base 13 and a virtually transparent magnetic layer 14 on the other side. An anti-static and lubricating layer 15 covers the magnetic layer.

Figure 2:
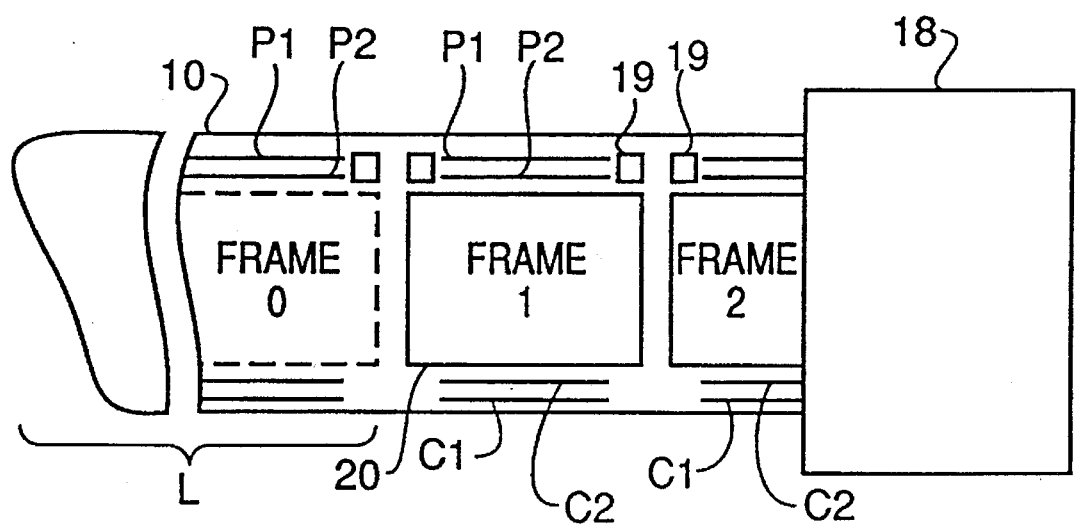
FIG. 2 is a plan view of the FIG. 1 film strip illustrating a track recording format which is useful for data recording in the present invention.

Referring to FIG. 2, a presently preferred form of film strip 10 includes perforations 19 intermittently spaced along the film edge at regular intervals matching the pitch of a metering mechanism in a camera adapted to use the film strip 10. Data is recorded on the film magnetic layer in track locations C1–C2 and P1–P2 along the marginal areas of the film outside of the regions of the image frames 20. Optionally, data may also be recorded in additional track locations within the regions of the image frames 20. It is contemplated that marginal tracks C1 and C2 are to be used by the camera to record data at the time of picture taking while the remaining two tracks P1 and P2 are to be reserved for recording of data by apparatus separate from the camera, such as by photofinishing equipment, an order entry station or the like. Among the various items of camera, a data field is recorded indicating the frame number of each image frame region on the film. It is further contemplated that a complete film strip, after photo processing, will be returned intact to the user rewound in a film cartridge, typically the original cartridge in which the unexposed film was purchased. This would be the case for positive, i.e. color reversal, film which previously would be returned mounted in slides, as well as negative film which is used to make positive prints and previously returned as cut film strips.

Figure 3:
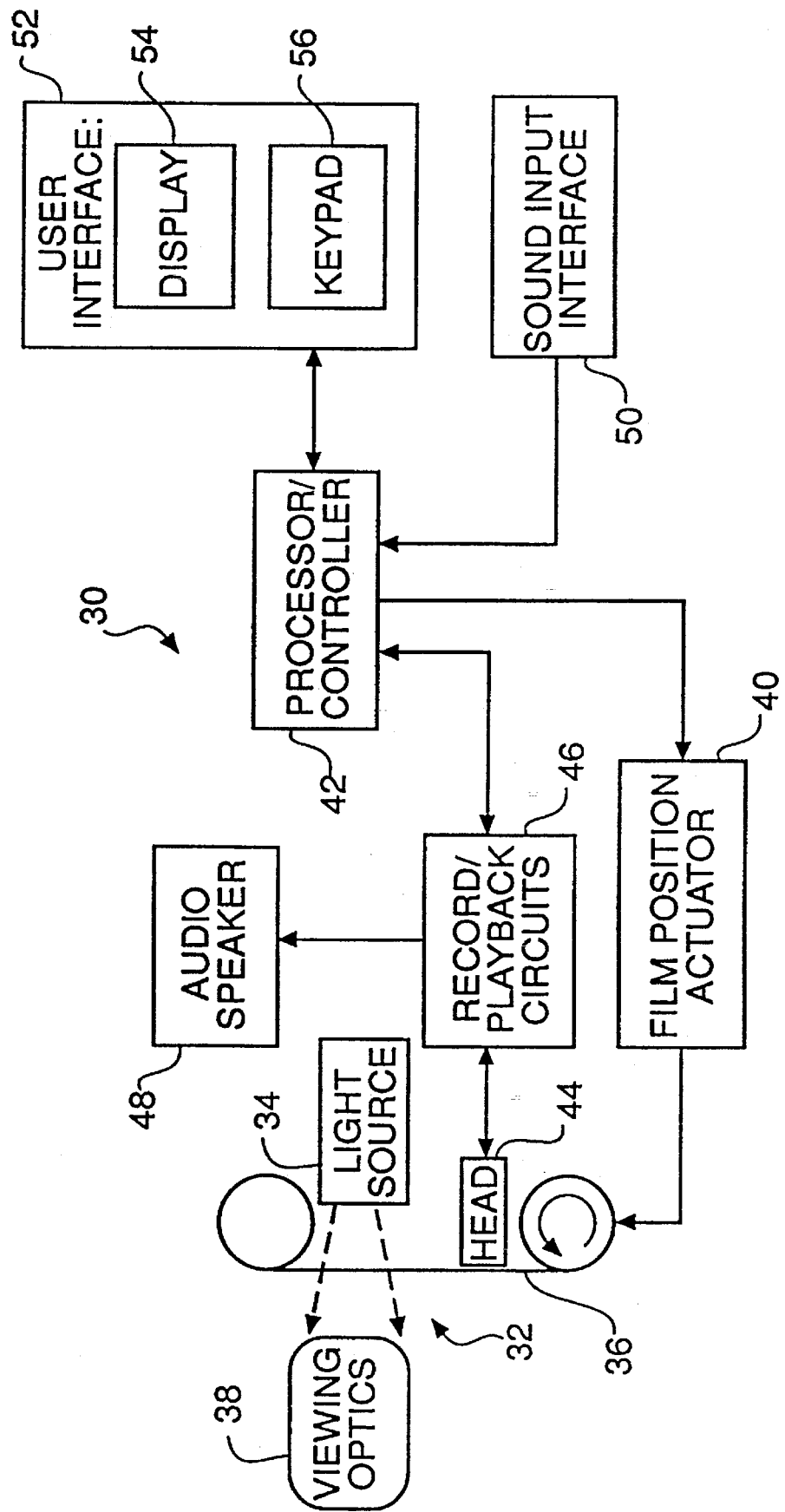
FIG. 3 is a schematic block diagram of apparatus for sequencing and displaying image frames on color reversal film in accordance with the invention.

Referring now to FIG. 3, there is shown film image display apparatus 30 for displaying color reversal film in a desired sequence in accordance with one aspect of the invention. A display station, shown generally at 32, includes a light source 34 for projecting light through an image frame on a color reversal film strip 36 onto viewing optics 38. Optics 38 may be a projector lens for projection onto a separate screen or it may be part of a self-contained backlit desktop projection system. Film advance control means includes a film position actuator 40 controlled from a central processor/controller 42 for periodically advancing film strip 36 to the image display station 32 in a desired sequence as will be described in more detail below. A read/write magnetic head 44 is provided to read and record magnetic data on one of the data tracks on the film magnetic layer. Record/playback circuit 46 is coupled to head 44 and is operative to drive head 44 to record data supplied from processor/controller 42 and to receive and pass to the processor/controller 42 data read by head 44 from the film magnetic layer. An audio speaker 48 is coupled to record/playback circuit 46 for optional playback of audio which may be recorded on the film magnetic layer. Recording of sound information on a film magnetic layer is described more fully in commonly assigned U.S. Pat. No. 4,965,627, the disclosure of which is incorporated herein by reference. The audio may be recorded on the film in the camera at the time of a picture taking event or, alternatively, it may recorded in apparatus 30 by the viewer from sound input through a sound input interface 50, e.g. microphone or tape recorder. An example of recording sound in a camera is described in commonly assigned U.S. Pat. No. 5,276,472, the disclosure of which is incorporated herein by reference. A user operated interface 52 includes an alpha-numeric display 54 and a keypad 56 operated by the viewer to input film sequencing information to be recorded on the film magnetic layer to be used in controlling the sequence at which the image frames on the film strip 34 are viewed. The interface 52 may also be used to actuate the apparatus 30 during viewing to cause the film position actuator 40 to select the viewing sequence of the film frames in accordance with the sequence data recorded on the film magnetic layer.

Figure 4:
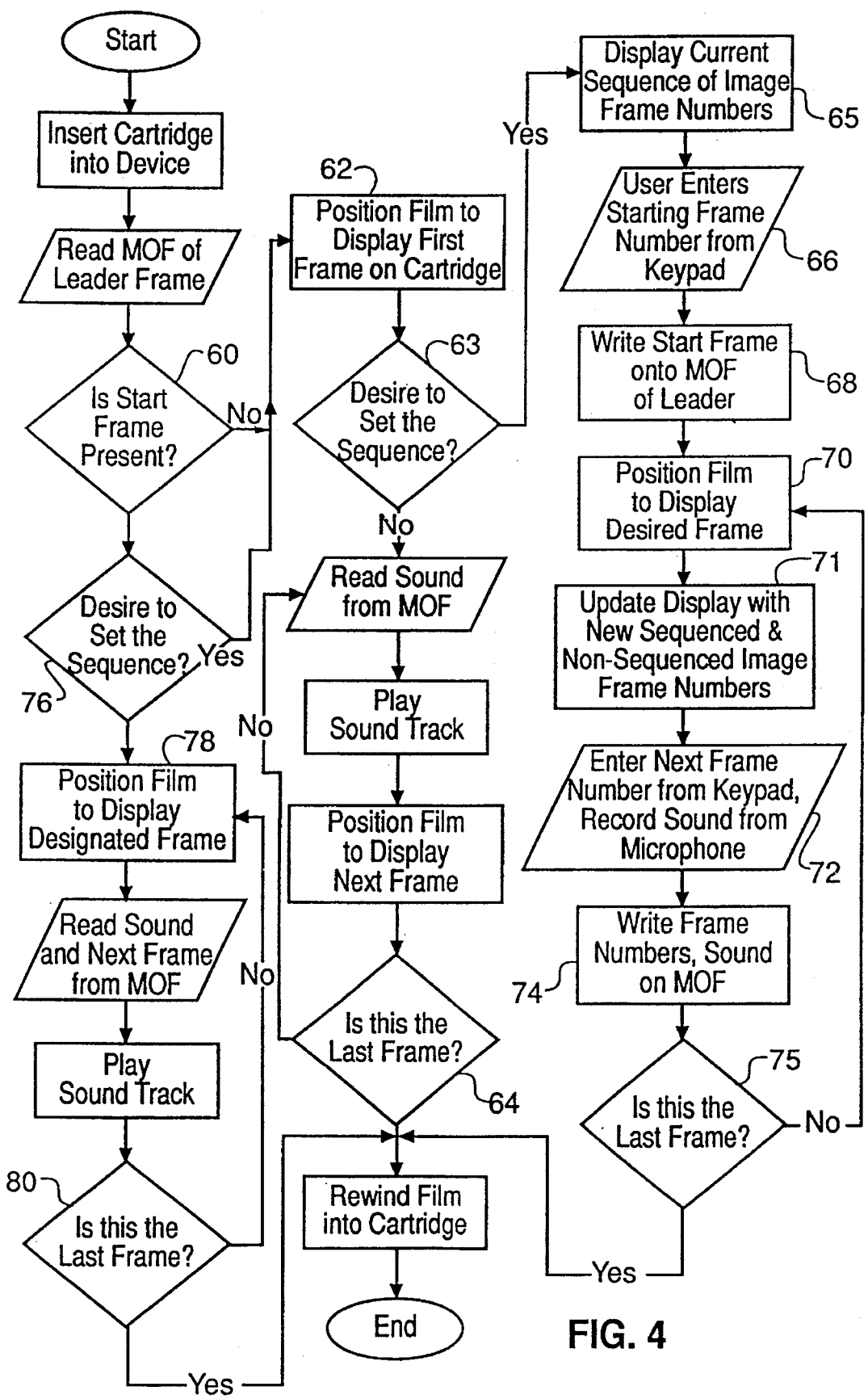
FIG. 4 is a program flow chart illustrating how the processor controller of the invention apparatus can be programmed to perform the sequencing and display functions according to the invention.

The operation of the FIG. 3 apparatus will be described in connection with the program flow chart of FIG. 4 which show how the processor/controller 42 may be programmed to allow the user to operate the apparatus 30 to create and record on the film magnetic layer a desired viewing sequence for the image frames on the film strip. Initially, the user inserts the film cartridge into a film track assembly, not shown, with the film spool engaged by actuator 40. The film is thrust out of the cartridge past read/write head and the appropriate track, e.g. track C2 on the film leader L located adjacent an imaginary Frame 0, is read. The controller determines at query 60 whether or not sequencing data in the form of a start frame number is recorded on the leader and, if not, the film is advanced by instruction 62 to place the first image frame in the optical path of the display station 32. Query 63 then determines whether the user has indicated via the keypad 56 a desire to create a particular viewing sequence. If not, the controller causes the image frames to be viewed in the normal sequence in which they appear on the film. If the film has a sound track recorded for the image frames, the sound data is read into memory in the record/playback circuits 46 as the film is moved into position and is played out via speaker 48 while the frame is being displayed. This sequence is repeated for each successive image frame on the film until query 64 determines that the last frame has been displayed at which time the program ends. The program then commands the controller to cause the film to be rewound into the cartridge for storage purposes.

If, query 63 determines that the user desires to create a custom sequence for displaying of the film images, the program moves to the subroutine headed by step 65 which causes the current sequence of image frame numbers to be presented on display 54. In step 66, a starting frame number is inserted by the user via keypad 56. Suitable prompts for this operation may be shown in the display 54. At step 68, the instruction causes the film to be returned to the leader (L) for writing of the start frame number in the appropriate leader track. Alternatively, the program may cause the start frame number to be stored temporarily in memory to be read out and recorded on the film leader after all of the sequenced frame numbers are determined. Using the frame number inputted by the user and by reading the magnetically recorded frame numbers on the film, step 70 positions the film for display of the selected image frame. The display 54 is updated in step 71 to show the newly selected sequence. Optionally, the display may also retain the previous sequence, as well as frames not yet selected, for user convenience. At step 72, the user is prompted to enter the next desired frame number and, optionally, to record sound, e.g. via a microphone, associated with the selected frame. Step 74 then records the next frame number in the designated track, e.g. track C2, associated with the selected frame. If sound has been input, it is recorded on the magnetic layer, e.g. in tracks within the associated image frame. This recording can be accomplished during or just prior to positioning the next selected image frame in the display station. Storing the sound integrally with the image avoids the necessity for additional sound and image synchronization. This process is repeated until the user indicates via the keypad that no further image frames are to be selected, as sensed by query 75, at which time the program ends. It will be appreciated that with this process, the user has complete freedom to establish which frame are to be displayed and which are to be ignored and also in which order or sequence the frames are to be displayed. The user can see on display 54 a list of frame numbers not yet resequenced. Moreover, by recording the sequence data on the film, the image display sequence is readily accessible each time the film display is performed.

Reverting to query 60, if it is determined upon loading of the cartridge into the display unit that a start frame number is recorded in the leader track, the program moves to query 76 to determine if the user wants to create a viewing sequence. This allows the user the flexibility to edit and change a prior sequence setting at any time. This is a further advantage of the invention in recording the sequence data on the magnetic layer of the film. If no changes are desired, the program moves into the viewing mode in which the sequence of display of the image frames is determined by the frame number sequence data recorded on the film. Initially, the film is moved at 78 to the frame designated by the data on the leader track. The next frame number is read and, if present, any sound information. After playing of the sound, and following an appropriate viewing interval, the film is moved to the next designated frame for display. The viewing interval may be established by the user by setting an internal timer, or the user may randomly advance the film using a "next frame" button on the keypad. The frame-by-frame viewing process is repeated until all designated frames have been displayed as determined by query 80.

As an alternative mode of operation, query 60 may also determine if a start frame number has been inserted via the keypad 56 which a user might do if the desire is to create and record a viewing sequence or to change an existing recorded sequence. If the keypad entered start frame number is sensed, the program would move directly to step 68 causing the start frame number to be recorded on the film leader after which the viewing sequence would be created and recorded as previously described.

Figure 5:
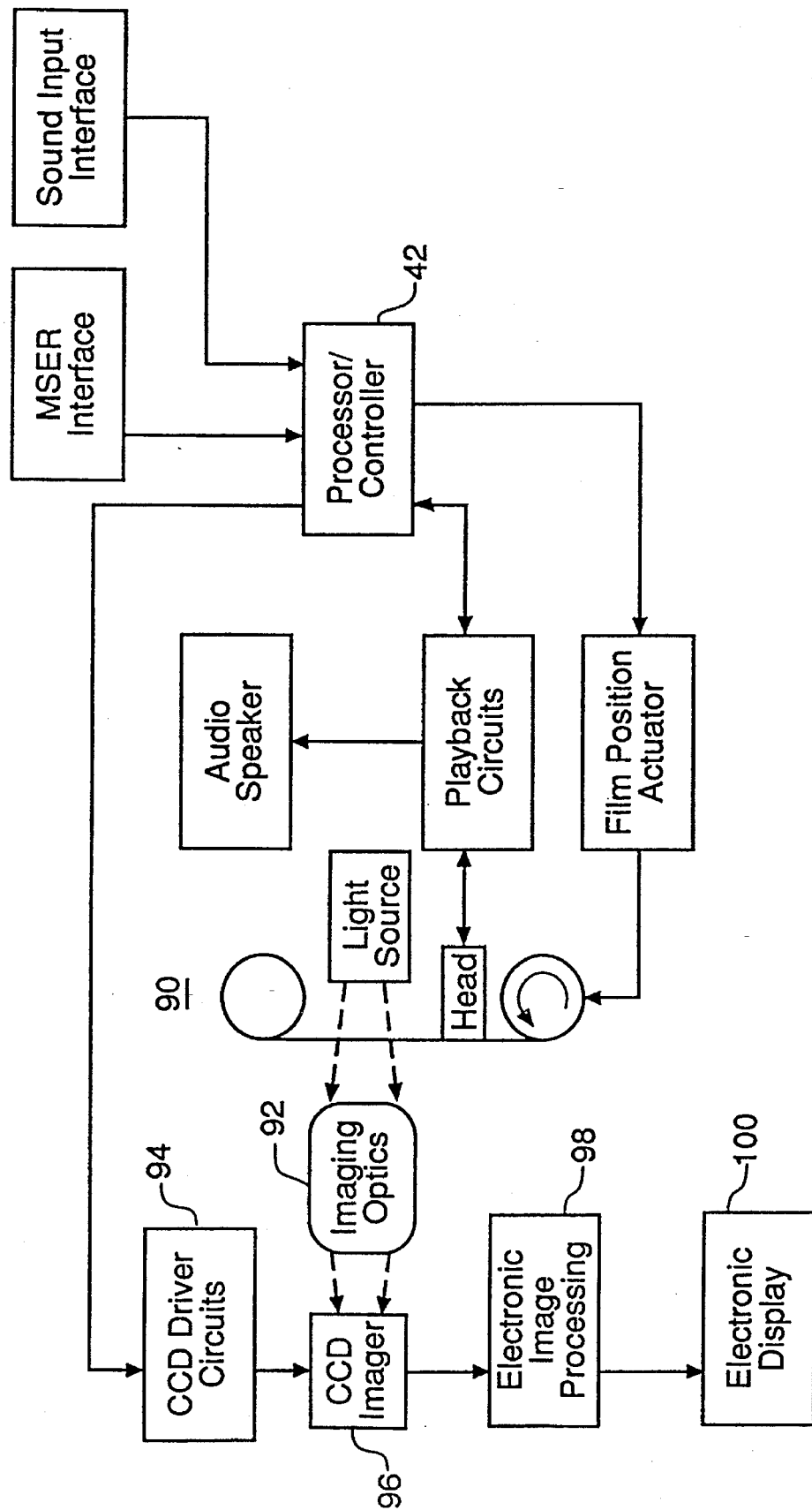
FIG. 5 is a schematic block diagram of an alternative embodiment of the FIG. 3 apparatus adapted to sequence and display image frames on negative color film.

Apparatus 30 of FIG. 3 is adapted for direct display of color reversal film similar to the display of sorted color slides in a projector. The invention is equally suited for custom sequence viewing of image frames on negative film in display apparatus 90 as seen in FIG. 5. Display apparatus 90 is similar to display apparatus 30 of FIG. 3 except for provision electronic image scanning and display features appropriate to converting the negative images on the film into viewable positive images. Thus, the image light is projected by imaging optics 92 onto a charge coupled device (CCD) imager 96 which is operated by CCD driver circuits 94 under the control of controller 42 to convert the optical image into a digital signal. The digital signal is then applied to electronic image processing circuits of known design for conversion of the negative image signal into positive signals suitable for application to an electronic display such as a cathode ray tube or liquid crystal display of known construction and operation.

Figure 6:
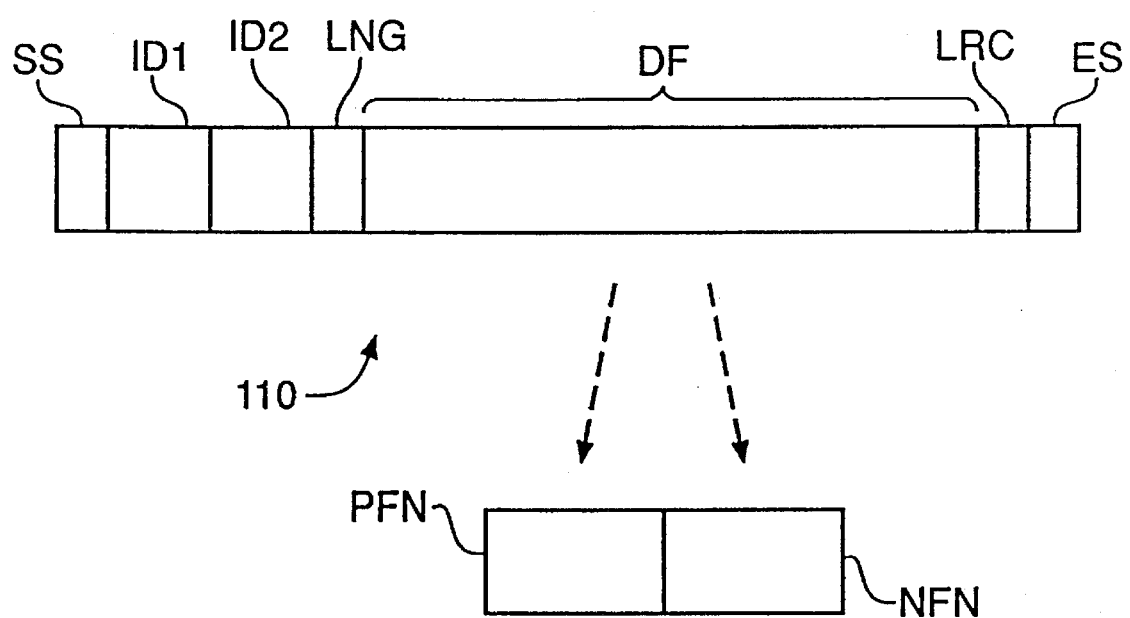
FIG. 6 is a diagram of a data recording format useful in recording of data on the film magnetic layer according to the invention.

While there are numerous techniques for recording of the frame viewing sequence data on the film, an example is shown in FIG. 6 which shows a camera data block 110 as might be recorded in camera track C2 by either of the previously described display apparatus. Block 110 includes two identification bytes ID1 and ID2 which indicate the type of data stored in the block 110. A start sentinel SS and an end sentinel ES indicate the beginning and end of the data block and a length code LNG indicates the length of the block. An LRC code is included for error checking purposes. The actual data fields are recorded in an area DF. Two of the data fields are used to record frame number information, specifically one field can be allocated to recording of the previous frame number (PFN) in the viewing sequence and the other for recording of the next frame number (NFN) in the sequence. It is contemplated that the current frame number is already recorded at another data block and does not need to be re-recorded in the data block devoted to recording of the viewing sequence data although it would be a simple matter to include a data field for this purpose. Preferably, recording of the previous frame number (PFN) is done at step 74 of the program at the same time that the next frame number (NFN) is recorded and is of value in sequence viewing to allow the user to go back to previously displayed frames.

It will be appreciated that what has been described is novel apparatus that provides a photographic film user with the convenient flexibility of viewing film stored in a cartridge in any sequence and to modify the sequence at any time. Also, the apparatus allows the user to add or edit sound linked to the image frames for simultaneous playback in the selected viewing sequence.

The invention has been described with reference to presently preferred embodiments. However, it will be appreciated that variations and modifications can be effected by a person of ordinary skill in the art without departing from the scope of the invention.

PARTS LIST 10 color film strip with magnetic layer
12 emulsion layer
13 film base
14 magnetic layer
15 antistatic and lubricating layer
16 film metering perforations
18 film cartridge
20 image frames
30 color reversal film image display apparatus
32 display station
34 light source
36 film
38 viewing optics
40 film position actuator
42 processor/controller
46 record/playback circuits
48 audio speaker
50 sound input interface
52 user interface
54 display
56 keypad
90 color negative film image display apparatus
92 imaging optics
94 CCD drive circuits
96 CCD imager
98 electronic image processing
100 electronic display
110 camera data block
C1, C2 camera data recording tracks
P1, P2 photofinisher data recording tracks
SS, ES start and end sentinels
ID1, ID2 data identification bytes
LNG data block length code
DF data fields
LRC longitudinal redundancy code
PFN, NFN previous and next frame numbers

What is claimed is:

1. Film image display apparatus for displaying image frames on photographic film stored within a film cartridge, said frames occurring in chronological sequential order of photographing on the film, the film having a magnetic recording layer formed thereon on which is recorded first data representative of said sequential order of photographing and second data representative of a predetermined frame viewing sequence other than said sequential order of photographing, the apparatus comprising:

a display station for receiving said cartridge and sequentially displaying images from said frames on said photographic film;

magnetic read means for reading said first and second data recorded on said film magnetic layer; and film advance control means responsive to said recorded first and second data for periodically advancing said film to said display station for display of said image frames in said pre-determined frame viewing sequence.

2. Apparatus according to claim 1 further comprising magnetic read means for reading sound information prerecorded on said film magnetic layer.

3. Apparatus according to claim 2 further comprising audio playback means for reproducing said sound information.

4. Apparatus according to claim 1 wherein said magnetic read means is adapted to read data recorded on a leader portion of the film representative of a first frame number in the pre-determined frame viewing sequence.

5. Apparatus according to claim 1 further comprising user-operated means for inputting said predetermined data as a user-determined frame number viewing sequence; and magnetic write means for recording said user-determined data on said magnetic layer.

6. Apparatus according to claim 5 further comprising user-operated means for inputting sound information and magnetic recording means for writing said sound information on said film magnetic layer.

7. Apparatus according to claim 5 wherein said magnetic write means is adapted to record, on a leader portion of the film, a frame number corresponding to a first frame number in the user-determined frame viewing sequence.

8. A method of operating a film image display apparatus to display a plurality of film images, from image frames occurring in a chronological sequence on film stored in a cartridge, in a predetermined, non-chronological frame viewing sequence, the film having a magnetic recording layer therein, the method comprising the steps of:

inserting said film cartridge into said film image display apparatus;

reading with a magnetic read head, first data recorded on said film magnetic layer representative of said chronological sequence;

reading, with a magnetic read head, second data recorded on said film magnetic layer representative of said pre-determined frame viewing sequence; and utilizing said read first and second data to control said film image display apparatus to display the film images in said pre-determined frame viewing sequence as indicated by said recorded sequence data.

9. The method of claim 8 including the step of rewinding the film into said cartridge after display of said image frames is completed.

10. The method of claim 8 further comprising the steps of periodically inputting frame viewing sequence data; and recording said inputted sequence data on the film magnetic layer.

11. The method of claim 10 further comprising the step of recording a first frame number of the frame viewing sequence in a leader portion of the film.

12. The method of claim 8 further comprising the steps of inputting sound information via a sound input interface; and recording said inputted sound information on the film magnetic layer.

13. A method of creating and storing with an image display apparatus, a user-determined image frame viewing sequence on photographic film having a magnetic recording layer thereon, the method comprising the steps of:

(a) inserting said film cartridge into said film image display apparatus with said film wound therein;

(b) advancing the film from the cartridge to place a first user-determined image frame in the viewing sequence at a display station;

(c) recording on the magnetic layer adjacent said first image frame a frame number representing a second user-determined image frame in the sequence;

(d) advancing the film to place said second image frame at the display station and recording adjacent said second image frame a frame number representing a third user-determined image frame in the sequence; and (e) repeating said advancing and recording step (d) until all user-determined frame numbers in the sequence have been recorded on the film.

14. The method of claim 13 further including the step of recording sound on said film associated with at least one of said image frames in said user-determined frame viewing sequence.

15. The method of claim 13 including the step of recording the frame number of said first user-determined frame number on a leader portion of the film.

* * * * *